United States Patent
Aulanko et al.

(10) Patent No.: US 6,581,270 B1
(45) Date of Patent: Jun. 24, 2003

(54) METHOD FOR PREPARING THE WINDINGS FOR AN ELECTRIC MOTOR

(75) Inventors: Esko Aulanko, Kerava (FI); Panu Kurronen, Hyvinkää (FI); Marko Tulander, Riihimäki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/403,165

(22) PCT Filed: Apr. 17, 1998

(86) PCT No.: PCT/FI98/00347
§ 371 (c)(1),
(2), (4) Date: Jan. 6, 2000

(87) PCT Pub. No.: WO98/48500
PCT Pub. Date: Oct. 29, 1998

(30) Foreign Application Priority Data

Apr. 18, 1997 (FI) .................................................. 971651
Sep. 15, 1997 (FI) .................................................. 973684

(51) Int. Cl.⁷ .............................................. H02K 15/04
(52) U.S. Cl. ..................... 29/596; 29/603.26; 29/605; 242/432; 310/200
(58) Field of Search .......................... 29/596, 598, 732, 29/603.26, 605; 242/432; 310/132, 133, 200

(56) References Cited

U.S. PATENT DOCUMENTS

| 3,035,195 A | 5/1962 | Juan et al. |
| 3,353,046 A | 11/1967 | Papst |
| 4,489,764 A | 12/1984 | Walker |
| 4,827,597 A | * 5/1989 | Hein et al. ..................... 29/596 |
| 4,864,715 A | 9/1989 | Sadier |
| 5,214,839 A | * 6/1993 | Reiber et al. ................... 29/596 |
| 5,359,249 A | * 10/1994 | Tanaka ....................... 310/216 |
| 5,994,813 A | * 11/1999 | Umeda et al. ............... 310/216 |
| 6,249,956 B1 | * 6/2001 | Maeda et al. .................. 29/596 |
| 6,317,962 B1 | * 11/2001 | Adachi et al. ................. 29/596 |

FOREIGN PATENT DOCUMENTS

| DE | 1815855 | 7/1970 |
| EP | 0356928 | 3/1990 |
| EP | 0455121 | * 4/1991 |
| EP | 0455121 | 11/1991 |
| GB | 1323010 | 7/1973 |
| GB | 2021329 | 11/1979 |
| GB | 2076710 | 12/1981 |
| GB | 2160797 | 1/1986 |
| GB | 2202170 | 9/1988 |

OTHER PUBLICATIONS

Derwent's abstract, No. 52–E0040B/18, week 5218, Abstract of SU, 612350 (NOVOS Electrotech), Jun. 8, 1978.

* cited by examiner

Primary Examiner—Gregory Vidovich
Assistant Examiner—Stephen Kenny
(74) Attorney, Agent, or Firm—Birch, Stewart, Kolasch & Birch, LLP

(57) ABSTRACT

The invention relates to a procedure for preparing the windings for an electric motor. The magnetic core (20) of the stator and/or rotor of the motor is provided with slots (24,25) in which winding coils (2; 5,7;15,17) can be fitted. According to the invention, the winding coils (2) are wound from winding wire and shaped substantially into their final form, the cross-section of the coil sides (15,17) corresponding to the space reserved in the slot (24,25) for the coil. The winding coils (15,17) are fitted in place in the slots (24,25) provided in the magnetic core.

13 Claims, 4 Drawing Sheets

METHOD FOR PREPARING THE WINDINGS FOR AN ELECTRIC MOTOR

This application is the national phase under 35 U.S.C. § 371 of PCT International Application No. PCT/FI98/00347 which has an International filing date of Apr. 17, 1998, which designated the United States of America.

FIELD OF THE INVENTION

The present invention relates to a method for preparing the windings for an electric motor, whereby the magnetic core of the stator and/or rotor of the electric motor are provided with slots in which winding coils can be fitted.

BACKGROUND OF THE INVENTION

In electric motors, the windings are attached either directly to the stator and/or rotor or to the ferromagnetic part of the stator/rotor. In the latter case, the windings are fitted in slots machined in a laminated core of magnetic material or around separate pole shoes protruding from the stator/rotor frame. The present invention relates to the preparation of the windings for motors in which the windings are fitted in slots. More particularly, the invention concerns a motor having open slots.

In the stators of smaller alternating-current motors, a semi-closed slot is used in which widened tooth edges at the slot opening partially cover the slot, preventing the windings from moving. The design of the tooth edge can also be used to modify the properties of the motor, such as stray reactance and control of the magnetic flux in the air gap. However, due to the semi-closed slot, the winding operation is very laborious because the winding coils have to be inserted trough the narrow slot opening one wire or a few wires at a time. It is therefore difficult to keep the winding coil in shape and the coil needs shaping after the winding operation.

In motors with an axial air gap, the tooth width is small on the inner side of the motor and the space left over for the winding overhang is very limited. The coils have to be so shaped that they can be accommodated in the space reserved for them and that their insulation will not be damaged when the coils are being mounted in place. Preparing the windings requires several operations, which are automated and simplified as far as possible.

SUMMARY OF THE INVENTION

The object of the present invention is to develop a new procedure for preparing the windings for an electric motor, designed to eliminate the drawbacks described above and applicable especially in the case of windings mounted in open slots. In particular, the object is to create a procedure that is applicable for the preparation of windings for a motor with an axial air gap. To achieve this, the winding coils are wound from winding wire, the winding coils are shaped into a substantially final form, the winding coils are fitted in place in slots provided in a magnetic core. By winding the winding coils in a mould having a width substantially equal to the width of the motor slot, the coil side will already have its final shape, ready to be fitted in the slot. According to another embodiment, the coil does not have a cross-section exactly corresponding to the slot after the winding operation, but the cross-section of the coil sides is shaped e.g. by forcing them into formers shaped like the slots, by means of which the winding coils are twisted into their final shape.

According to an embodiment, the first coil side of a winding coil is fitted into one motor slot and the coil is turned so that the other coil side goes into another motor slot. The first coil side of each winding coil will thus go into the lower part of a slot, and a coil side of another coil will be placed on top of it, and the second coil side of the coil will go into the upper part of another slot on top of a third coil side in the case of a two-layer winding.

According to a preferred embodiment of the invention, the end windings have been formed into their final shape before the coil is fitted in the slots. This makes it unnecessary to turn the end windings while the coil is being mounted, and the end windings have been so bent that they will smoothly interlace with other end windings.

According to a preferred embodiment, each winding coil is a separate coil when it is being fitted into the slot, and after they have been fitted into the slots, the winding coils are connected together to form the desired winding. The winding coils are easy to produce as separate coils and they can be shaped and fitted into the slots faster than interconnected coils. The insulation is not so susceptible to being damaged. This procedure is particularly applicable to axial motors, in which the space for the winding overhang on the inner circle is very narrow.

According to an embodiment alternative to the previous one, two or more winding coils are connected in series before the coils are fitted into the slots, and the extreme wire ends of the series-connected coils are connected to other series of coils so as to form the desired winding. This will reduce, and in extreme cases eliminate, the work of soldering the windings together. This embodiment is applicable in the case of motors with sufficient space for the windings or in which the end windings are of the same shape at both ends of the slot, e.g. in linear motor applications.

After the winding coils have been fitted into the slots, the slots are preferably closed with ferromagnetic wedges inserted into chases formed in the slots. The coils rest against the wedges in the depth direction of the slot and no special measures are needed after the wedge has been mounted. The use of slot wedges also results in an air gap flux free of harmonics, so the vibrations and noise caused by harmonics is substantially reduced. This is a significant feature especially in a synchronous motor with permanent magnets because the number of stator slots is normally divisible by the number of magnets on the rotor. All the magnets are therefore in the same position with respect to stator slots. Thus, changes in flux density in the symmetrically divided air gap at the edges of the slot openings/teeth produce axial and tangential forces in all magnets at the same time and in the same direction. By shaping the slot wedge, it is possible to influence the flux control and therefore also the vibration and noise level as well as stray reactances in the motor. In this way it is also possible to achieve magnetic properties in the air gap surface of the motor that are nearly equivalent to those of a semi-closed slot.

In the case of an axial or conical motor, the slots at the edge closer to the axis are closer to each other than at the outer edge. In this case, the coils are preferably so shaped already during the winding operation that the end windings differ in length, by making the first end winding, which lies closer to the axis, shorter than the second end winding, which is farther removed from the axis.

Further preferred embodiments are defined in the subclaims.

The above and further objects and features of the invention will be more fully apparent from the following detailed description with accompanying drawings.

BRIEF DESCRIPTION OF THE DRAWINGS

In the following, the invention will be described in detail by referring to the drawings, in which.

DETAILED DESCRIPTION OF THE PREFERRED EMBODIMENTS

Figure 1:
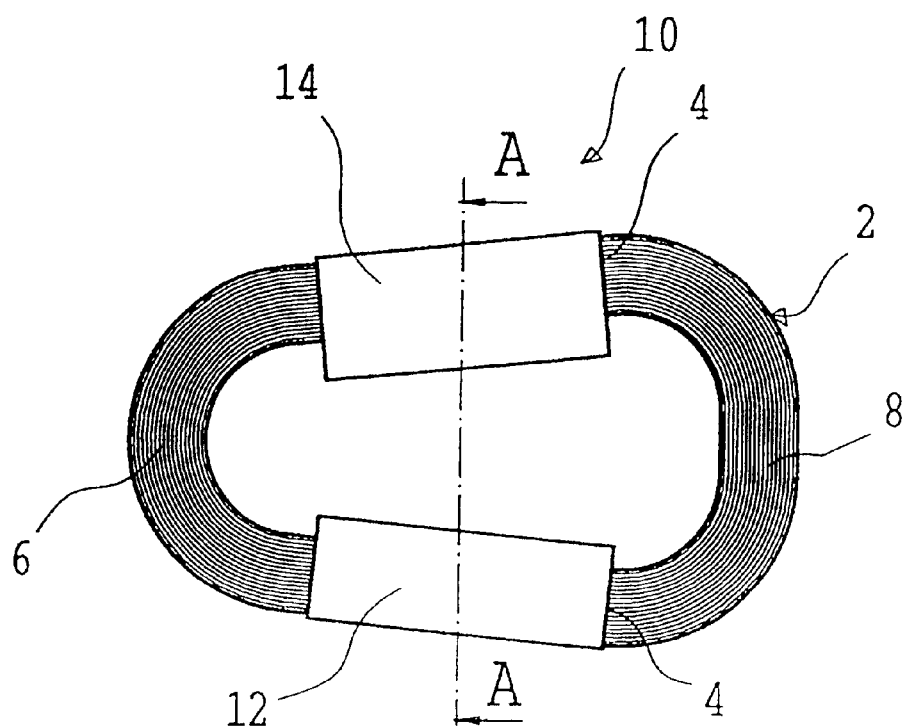
FIG. 1 is a schematic of a winding coil.
Figure 2A:
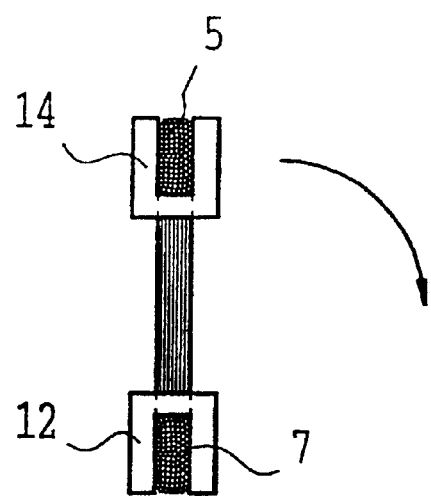
FIG. 2a is a cross-section of the winding coil, taken along line A—A in FIG. 1.

To produce the winding for a motor, winding wire is coiled on a coiling machine (not shown) into a winding coil 2 of a shape as illustrated by FIG. 1, in which the coil has straight coil sides 4, which will be fitted into slots in the motor. Preferably the winding coil has a rectangular cross-section at least in the area of the coil side (FIG. 2a). The coil formers comprise two U-shaped troughs 12 and 14 having a trough width corresponding to the slot width of the motor. The coil is wound by the random winding method, and the shape of the former produces the correct shape in the part of the coil to be fitted into the slot, i.e. the coil side. During the winding operation, the former troughs are preferably at a distance determined by the slot pitch of the motor from each other. In the case of an axial motor, the former troughs are also skewed relative to each other by the same angle as the motor slots in which the coil sides are to be fitted. Therefore, the first end 6 of the winding coil has a smaller bending radius and it forms the inner end winding in the axial motor. Correspondingly, the other end 8 of the winding coil has a larger bending radius and it forms the outer end winding in the axial motor. In motors with parallel slots, the end windings are naturally identical. In a coil wound in a rectangular former, the end windings also have a rectangular cross-section. The winding coil can also be wound as a ring of circular or other shape. A shape with straight coil sides as shown in FIG. 1 reduces the need to bend the winding wires at a later stage, thus reducing the risk of the insulation being damaged.

Figure 2B:
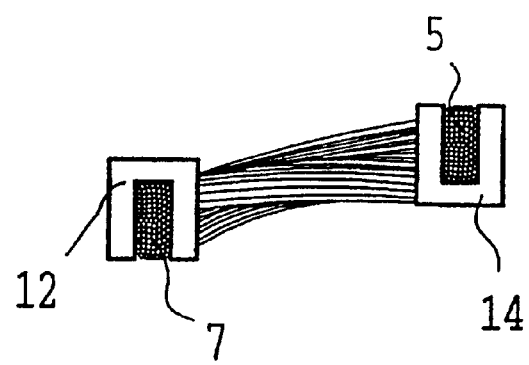
FIG. 2b is a cross-section of a shaped winding coil.

After being wound, the winding coil 2 is straight and the coil sides in the troughs 12 and 14 of the coil former are parallel to each other in the depth direction of the slot, in other words, the first coil side 5 and the second coil side 7 are aligned as seen from the direction of the air gap, i.e. from above or from below in FIG. 2a. The coil former can also be used as a shaping tool to twist the coil into the final shape in which it is to be mounted in the motor. Trough 14 of the former is turned sideways through an angle somewhat less than 90° while maintaining the same trough attitude, i.e. maintaining the cross-section of coil side 5 in the same orientation with the cross-section of coil side 7 (FIG. 2b). In the case of an axial motor, the upper coil side 5 is simultaneously turned askew by an angle corresponding to the skewness of the slots. If several coils or all the coils for the motor are to be shaped at the same time, the upper trough is turned by a multiple of the slot pitch and trough 14 is simultaneously pressed down toward the level of trough 12. As shown in the figure, the coil sides are not exactly aligned horizontally, but the lower edge of coil side 5 is at the level of the upper edge of coil side 7. The coil sides will go into different slots in the motor, coil side 7 being placed on the bottom of one slot while the other coil side 5 is placed in another slot, in the part of the slot facing the air gap of the motor, thinking of the laminated core of the motor as being placed under the coil in FIG. 2b.

Before the winding coils are fitted into the slots, the coil sides are wrapped in insulating slot liner material, which is an insulating material known in itself as used in electric motors, such as insulating tape. The coil sides are then fitted into the slots so that the first coil side of each coil goes to the bottom of a slot while the second coil side goes into another slot on top of the coil side of another coil. When the coils are being mounted, the end windings are insulated using winding overhang insulation known in itself. The windings are locked in place with slot wedges (FIG. 3b) and the wire ends of the coils are connected to each other so as to form a desired winding, e.g. a three-phase winding for a given number of poles. The end windings are insulated using suitable winding overhang insulation as is known in the art.

Although the winding coils have been described above as separate coils, it is possible within the framework of the invention to connect several coils together during the winding operation so that the coils are already interconnected when they are mounted in the motor.

Figure 3A:
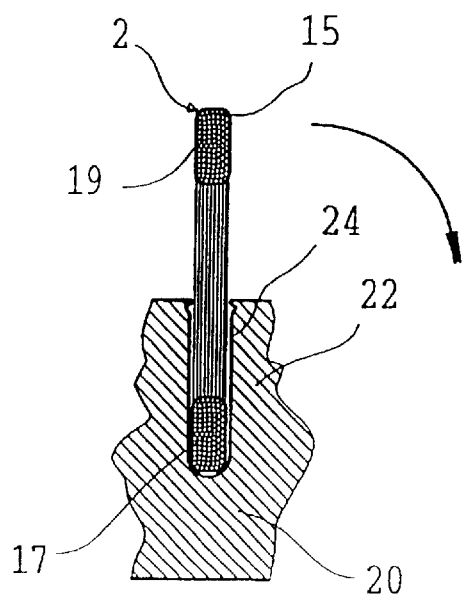
FIG. 3a is a cross-section of an unshaped, winding coil with its first coil side in a slot.
Figure 3B:
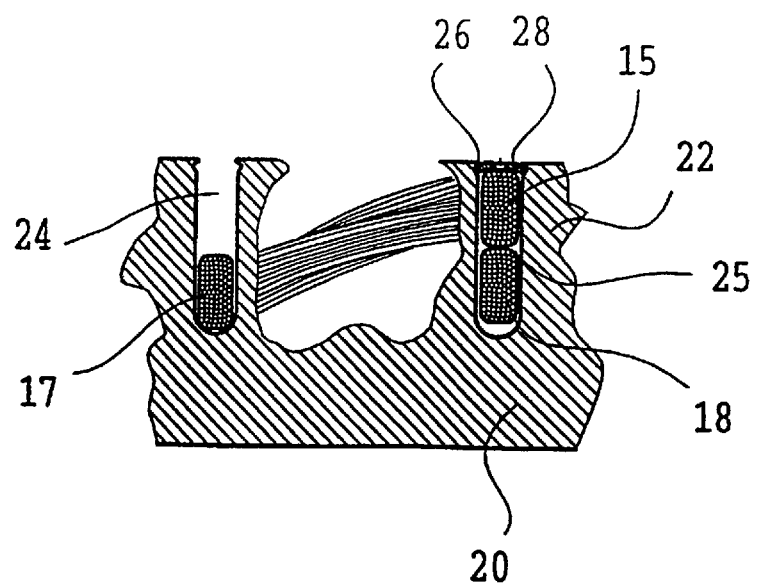
FIG. 3b is a cross-section of a shaped winding coil fitted in slots.

FIGS. 3a and 3b illustrate an alternative method of shaping the coil. The coil sides of a coil of rectangular cross-section are insulated with insulating slot liner material 19, which also holds the coil firmly in place and keeps it sufficiently in shape during mounting. The first coil side 17 has been fitted to the bottom of the slot 24. The figures show a part of the laminated core 20 of the stator as well as slots 24 and 25 punched in the laminated core. Between the slots there are teeth 22. A shaping tool is fitted onto coil side 15 and, using the tool, the coil side 15 is turned sideways and toward the laminated stator core so that the coil side goes into slot 25. The coil side is pressed down to a depth that leaves under it a space of a height corresponding to another coil side to be fitted into this space. Between slots 24 and 25 there may be one or more slots, depending on the structure of the motor. In practice, it is advisable to bend the coil before the other coil has been placed on the bottom of the slot to ensure that the coil is bent to its final shape without leaving any tension in it. Punched at the ends of the teeth are chases 26 into which the slot wedges 28 are fitted to hold the windings in place. The chases in the stator slots as well as the stator slots themselves are punched out in the laminates before the stator core is assembled. The laminated stator core can be manufactured in several known ways and the stator slots may have different shapes or be laid in different directions as illustrated by the example in FIG. 5.

The slot wedges 28 are preferably made of ferromagnetic material so that they also form part of the magnetic circuit controlling the magnetic flux in the air gap and at the tooth ends. In other respects, the winding overhang insulation and the connections between the coil conductors are implemented as in the embodiment described first. The tooth can also be so shaped that the slot has a uniform width from end to end and a shoulder is formed at the tooth end, the slot wedge being fitted under the shoulder. The slot wedge will be stopped by the shoulder as the winding coil presses it toward the air gap. The slot wedge may also be glued in place with resin.

Figure 4:
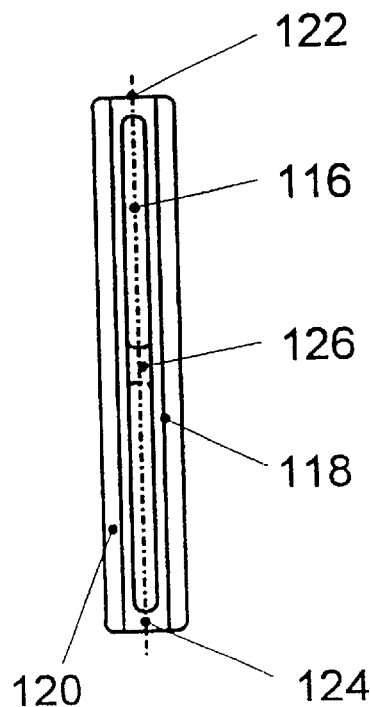
FIG. 4 is a schematic of a slot wedge as seen from the direction of the air gap.

The slot wedge has been formed from one piece of ferromagnetic material. It can also be made e.g. of the same material as the laminated stator core. The slot wedge is produced e.g. by laser cutting or by die cutting, whereupon the slot wedge is bent longitudinally so that the edges of the slot wedge fit into the chases 26 in the stator slot 24. The slot wedge has a thickness such that, when fitted in the chase in the stator slot, the outer surface of the slot wedge is substantially flush with the air gap surface of the laminated stator core. In the central part of the slot wedge (FIG. 4) there is a punched or laser-cut opening 116 having and elongated form in the longitudinal direction of the slot wedge, so the slot wedge can be regarded as consisting of two parallel bars 118 and 120 connected at both ends by cleats 122 and 124. The bars 118 and 120 are of a size such that they will hold the stator windings sufficiently firmly in place and that they will withstand the strain imposed on them by the windings and the magnets. The magnetic properties of the slot wedges are used to control the distribution of the air gap flux so as to minimise harmonics causing noise and vibration and to adjust the stray reactances in the motor to a desired level. The primary function of the cleat parts 122 and 124 of the slot wedges is to keep the slot wedge in shape during mounting and use, and they may become saturated during use. If necessary in view of slot wedge strength requirements, intermediate cleats can be provided between the end cleats of the slot wedge, e.g. as indicated with broken lines 126 in the example in FIG. 4.

The slot wedge is made of ferromagnetic material, either uncoated or coated e.g. with nylon. The junctions 128 between the slot wedge bars 118,120 and the end cleats 122, 124 are rounded to allow easier manipulation and mounting.

Figure 5:
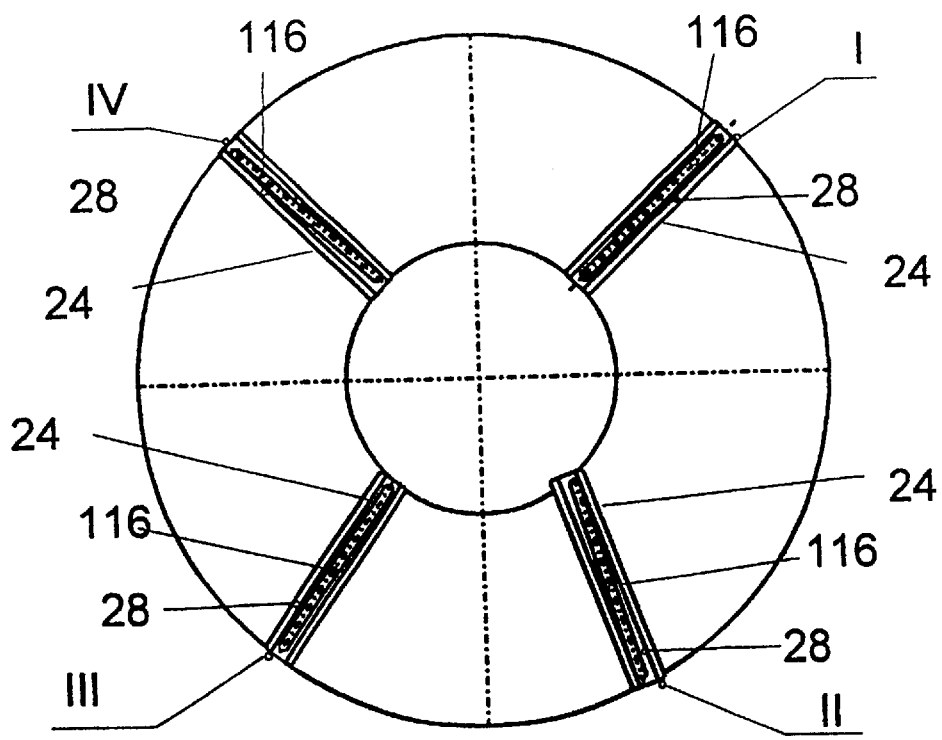
FIG. 5 is a schematic of the stator of an axial motor as seen from the direction of the air gap.

According to an embodiment of the invention, the openings in the slot wedges are not exactly parallel to the central axis of the slot wedge but slightly oblique to it, so the width of the slot wedge bars varies along the length of the wedge. FIG. 5 illustrates four different alternatives for disposing the slot wedges and the slots in a motor with an axial air gap, the stator being depicted in the axial direction as seen from the air gap. The figure does not represent the stator of the motor but an example of the position of the slot and slot wedge in relation to the direction of the motor radius. In alternative I, the slots 24 are laid in the direction of the motor radius, and the openings 116 in the slot wedges 28 fitted in the slots are also radially oriented. In alternative II, the slots 24 are somewhat askew relative to the radius, and the slot wedge openings are more skewed relative to the radius than the slots. In alternative III, the slots are askew as in alternative II, but the slot wedge openings lie symmetrically in the central area of the slot wedges, so the slot wedges are skewed by the same angle to the radius as the stator slots are. Finally, in the case of alternative IV, the stator slots are laid in the radial direction but the slot wedge openings are askew, in which case slot skewness is only created by the slot wedges and their openings.

Figure 6:
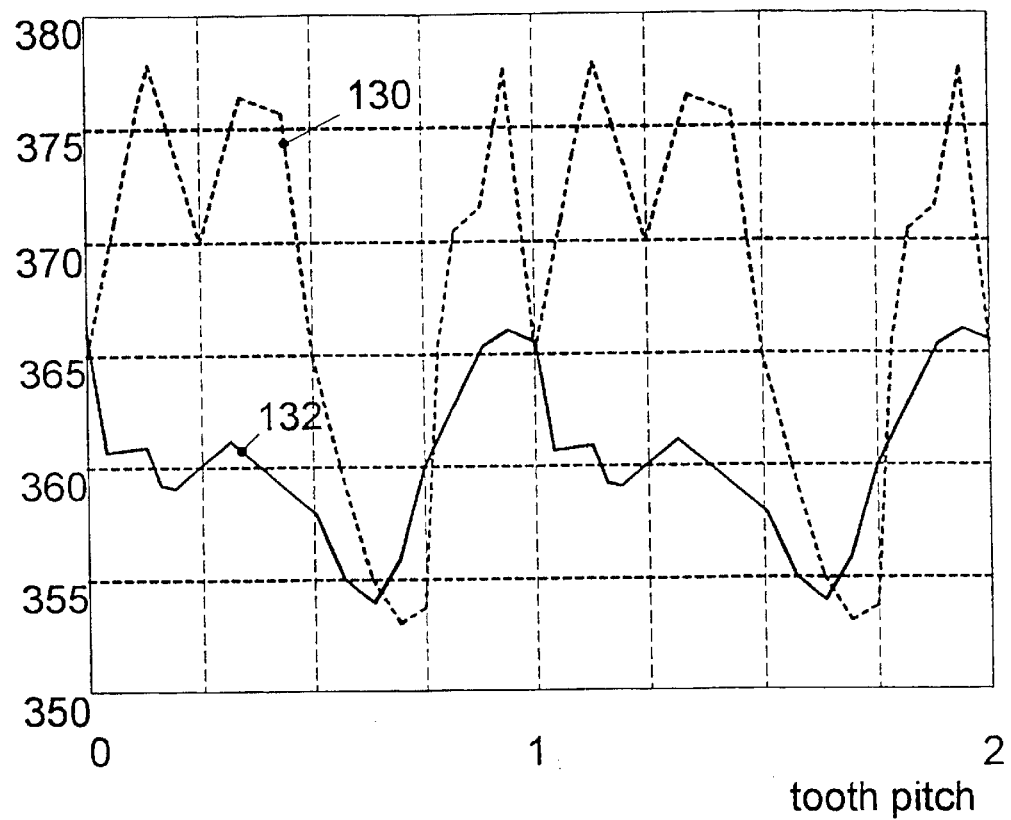
FIG. 6 is a graph illustrating the variation in the air gap torque.

The effect of closing the stator slots with a slot wedge according to the invention is illustrated by the graph in FIG. 6. The broken line curve 130 represents the variation in the air gap torque over a distance corresponding to two tooth intervals in a synchronous motor with an axial air gap and permanent magnets and with open slots which are closed with a conventional non-magnetic slot stopper. The solid line curve 132 represents the variation in the torque in the same motor with the slots closed with slot wedges according to the invention. By comparing the curves, it will be observed that harmonics are clearly reduced, which signifies a lower level of noise and vibration.

The invention has been described above by the aid of one of its embodiments. However, the presentation is not to be regarded as constituting a limitation of the sphere of patent protection, but the embodiments of the invention may vary within the limits defined by the following claims.

What is claimed is:

1. A method for preparing the windings for an electric motor, the magnetic core of the stator and/or rotor of said electric motor being provided with slots in which winding coils can be fitted, said method comprising the steps of:

winding the winding coils from winding wire by a random winding method;

shaping the winding coils substantially into their final form by winding the winding coils around trough shaped formers; and fitting the winding coils in place in the slots provided in the magnetic core, after the step of shaping is completed.

2. The method according to claim 1, wherein each winding coil is shaped by fitting the coil sides into formers shaped like the slots and turning the formers so that the coil sides of the winding are in a position substantially corresponding to the slots.

3. The method according to claim 1, wherein the first coil side of a winding coil is fitted into one motor slot and the coil is turned so that the other coil side goes into another motor slot.

4. The method according to claim 3, wherein the first coil side is fitted in the lower part of one motor slot and the second coil side is fitted in the upper part of another motor slot.

5. The method according to claim 1, wherein the winding coils, including the end windings, are shaped substantially into their final form before being fitted into the slots.

6. The method according to claim 1, wherein each winding coil is a separate coil when it is being fitted into the slot, and that after they have been fitted into the slots, the winding coils are connected together so as to form a desired winding.

7. The method according to claim 1, wherein two or more winding coils are connected in series before the coils are fitted into the slots, and the extreme wire ends of the series-connected coils are connected to other series of coils so as to form a desired winding.

8. The method according to claim 1, wherein after the winding coils have been fitted into slots, the slots are closed with wedges inserted into the upper parts of the slots.

9. The method according to claim 8, wherein the slot wedges are made of a substantially homogeneous ferromagnetic material and that the slot wedges are secured in a chase formed in the slot in the longitudinal direction of the slot.

10. The method according to claim 9, wherein the slot wedges have an elongated shape and that their opposite long edges comprise protrusions which are fitted into the chases in the slots.

11. The method according to claim 10, wherein by changing the dimensioning of the slot wedges, the stray reactance and/or distribution of the air gap flux in the electric motor is regulated.

12. The method according to claim 1, wherein the shaped winding coils are stiffened and bound with insulating tape.

13. The method according to claim 1, wherein the first end winding of the coil is shorter than the second end winding.

* * * * *